United States Patent
Handley et al.

(10) Patent No.: US 7,116,443 B2
(45) Date of Patent: Oct. 3, 2006

(54) NEUTRAL PIXEL DETECTION USING COLOR SPACE FEATURE VECTORS WHEREIN ONE COLOR SPACE COORDINATE REPRESENTS LIGHTNESS

(75) Inventors: John C. Handley, Fairport, NY (US); Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 996 days.

(21) Appl. No.: 10/137,677

(22) Filed: May 2, 2002

(65) Prior Publication Data

US 2003/0206307 A1 Nov. 6, 2003

(51) Int. Cl.
- H04N 1/60 (2006.01)
- G03F 3/08 (2006.01)
- G06K 9/00 (2006.01)

(52) U.S. Cl. .................. 358/1.9; 358/518; 382/162; 382/165; 382/167

(58) Field of Classification Search ............. 382/166, 382/190, 167, 165, 162; 358/1.9, 518; 706/120; 348/222
See application file for complete search history.

(56) References Cited

U.S. PATENT DOCUMENTS

| | | | |
|---|---|---|---|
| 4,220,972 A * | 9/1980 | Geokezas et al. ........... 348/573 |
| 5,282,026 A | 1/1994 | Nagata | |
| 5,287,204 A | 2/1994 | Koizumi et al. | |
| 5,552,825 A * | 9/1996 | Talluri et al. ............ 348/222.1 |
| 5,761,385 A * | 6/1998 | Quinn ........................ 706/20 |
| 5,966,462 A | 10/1999 | Linder et al. | |
| 6,249,592 B1 | 6/2001 | Fan et al. | |
| 2003/0095709 A1* | 5/2003 | Zhou ........................ 382/190 |
| 2003/0179925 A1* | 9/2003 | Hsu ........................... 382/166 |

* cited by examiner

*Primary Examiner*—Kimberly Williams
*Assistant Examiner*—Charlotte M. Baker
(74) *Attorney, Agent, or Firm*—Fay, Sharpe, Fagan, Minnich & McKee, LLP

(57) ABSTRACT

A method for neutral pixel detection using color space feature vectors wherein one color space coordinate represents lightness is provided. The method includes the following steps: a) receiving an input image represented in a first color space; b) converting the input image to a second color space wherein one coordinate represents lightness; c) selecting a pixel in the second color space representation to be classified; d) computing second color space feature vectors associated with the selected pixel; and e) classifying the selected pixel between neutral and color classes based on the values computed for the second color space feature vectors. Typically, the input image is processed using a smoothing filter to create a smoothed input image prior to the conversion to the second color space. The method can be adapted to page processing or strip processing schemes with respect to the input image.

16 Claims, 8 Drawing Sheets

NEUTRAL PIXEL DETECTION USING COLOR SPACE FEATURE VECTORS WHEREIN ONE COLOR SPACE COORDINATE REPRESENTS LIGHTNESS

BACKGROUND OF INVENTION

The invention relates to neutral color detection. It finds particular application in conjunction with neutral pixel detection in image data using color space feature vectors wherein one color space coordinate represents lightness and will be described with particular reference thereto. However, it is to be appreciated that the invention is also amenable to other applications.

Neutral colors include black, white, gray, and colors containing a predetermined amount of gray. In a three-dimensional color space where one of the color space coordinates represents lightness (i.e., luminance), neutral colors are grouped on or near the lightness axis of the color space. One such color space is commonly known as the L*a*b* color space.

In the L*a*b* color space, values L*, a*, and b* are plotted at right angles to one another to form a three dimensional coordinate system. Equal distances in the color space represent equal color differences. Value L* represents a position with respect to a lightness (i.e., L*) axis; value a* represents a position with respect to a redness/greenness (i.e., a*) axis; and value b* represents a position with respect to a yellowness/blueness (i.e., b*) axis. The L*a*b* color space is also referred to as CIELAB, CIE L*a*b*, or CIE Lab. CIE (Commission International de L'Eclairage) is an international commission on illumination that is the main international organization concerned with color and color measurement.

In color image processing, reproduction, recording and the like, a page of image data is read and typically a three-color, cyan-magenta-yellow (CMY), system is employed for rendering. Optionally, a fourth color, black (K), is included. Generally, combinations of the colors CMY are applied in relative proportions to produce the color portions of the image. Additionally, the CMY colors can be applied to produce a resultant black. However, the resultant black achieved by combining the CMY colors is not as high quality as that achieved with the true black (K). Chromatic noise, misregistration, and the like can degrade the quality of black images generated by a CMY resultant black application. Moreover, multiple CMY passes are relatively more time consuming compared to a K pass, and they increase the depletion of CMY inks and/or toners. Generally, these and other inherent constraints, limitations, and/or reproduction demands associated with color processing and/or printing make it desirable to limit CMY utilization where possible.

In the past, there have been developed techniques for determining if input pages are neutral in color (i.e. black and white, or monochromatic) to thereby reduce CMY utilization where it was not necessary. For example, in U.S. Pat. No. 5,287,204 to Koizumi et al. and U.S. Pat. No. 5,282,026 to Nagata, both incorporated herein by reference, such techniques are disclosed. However, both references achieve limited results. That is to say, the references are directed to detecting at the page level and determining if an input page is neutral in color. Generally with these techniques, each page as a whole is classified as color or neutral, which results in either the whole page undergoing color processing or none of the page undergoing color processing. As such, these approaches fail to address, for example, chromatic noise in a neutral region of an otherwise color page. Moreover, no provisions are made for high quality neutral detail, such as text, that may be located in a color page or region thereof.

A more recent method of neutral color detection is disclosed in U.S. Pat. No. 6,249,592 to Fan et al., incorporated herein by reference. This method provides neutral color detection of a whole page or one or more regions in a page. This method includes reading an input page. The contents of the page are detected and it is determined if the page is neutral in color. If the page is not neutral in color, the page is then divided into a number of regions. Each region is then detected, and a determination is made if individual regions are neutral in color. Next, details located outside regions determined to be neutral in color are detected and it is determined if the details are neutral in color. This multi-resolution technique permits the full page, an individual region, and/or particular details to be processed without the constraints, limitations, and reproduction demands associated with their color counterparts. However, a drawback of this method is that it requires the computation of images at multiple resolutions in order to judge whether a region is neutral or not. This can be time consuming in applications.

Color image paths in copiers, scanners, and printers must maintain performance at a certain page per minute (ppm) level (for example, but not limited to, 20–100 ppm). Image processing within the color image path requires substantial storage space (e.g., 90 Mbytes per page). If an entire document image is deemed neutral, color image processing can be bypassed, saving time, memory, and color ink or toner. If a region of a document image is deemed neutral, the image can be processed using a halftoning algorithm selected to increase image quality. If a pixel in a document image is deemed neutral, the pixel can be printed with black ink or toner.

BRIEF SUMMARY OF INVENTION

Thus, there is a particular need for a method of neutral pixel detection. The invention contemplates a method for neutral pixel detection that overcomes at least one of the above-mentioned problems and others.

In one aspect of the invention, a method for classifying a pixel between neutral and color classes for use in color image processing is provided. The method includes the following steps: a) receiving an input image represented in a first color space; b) converting the input image to a second color space wherein one coordinate of the second color space represents lightness; c) selecting a pixel in the second color space representation of the input image to be classified; d) computing second color space feature vectors associated with the selected pixel; and e) classifying the selected pixel between neutral and color classes based on the values computed for the second color space feature vectors.

In another aspect of the invention, a method for neutral pixel detection for use in color image processing is provided. The method includes the following steps: a) receiving an input image represented in a first color space; b) converting the input image to a second color space wherein one coordinate of the second color space represents lightness; c) selecting a pixel in the second color space representation of the input image; d) computing second color space feature vectors associated with the selected pixel; and e) detecting if the selected pixel is neutral based on the values computed for the second color space feature vectors.

In yet another aspect of the invention, a method for classifying pixels of an input image between neutral and color classes for use in color image processing is provided. The method includes the following steps: a) receiving a first strip of an input image represented in a first color space wherein the strip is comprised of a plurality of scanlines; b) converting the input image strip to a second color space wherein one coordinate of the second color space represents lightness; c) selecting a first pixel in the second color space representation of the input image strip to be classified; d) computing second color space feature vectors associated with the selected pixel; e) classifying the selected pixel between neutral and color classes based on the values computed for the second color space feature vectors; f) determining if any additional pixels of the input image strip to be classified have not been classified; and g) if any additional pixels to be classified have not been classified, selecting a next pixel in the second color space representation of the input image strip to be classified and repeating steps d) through f).

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
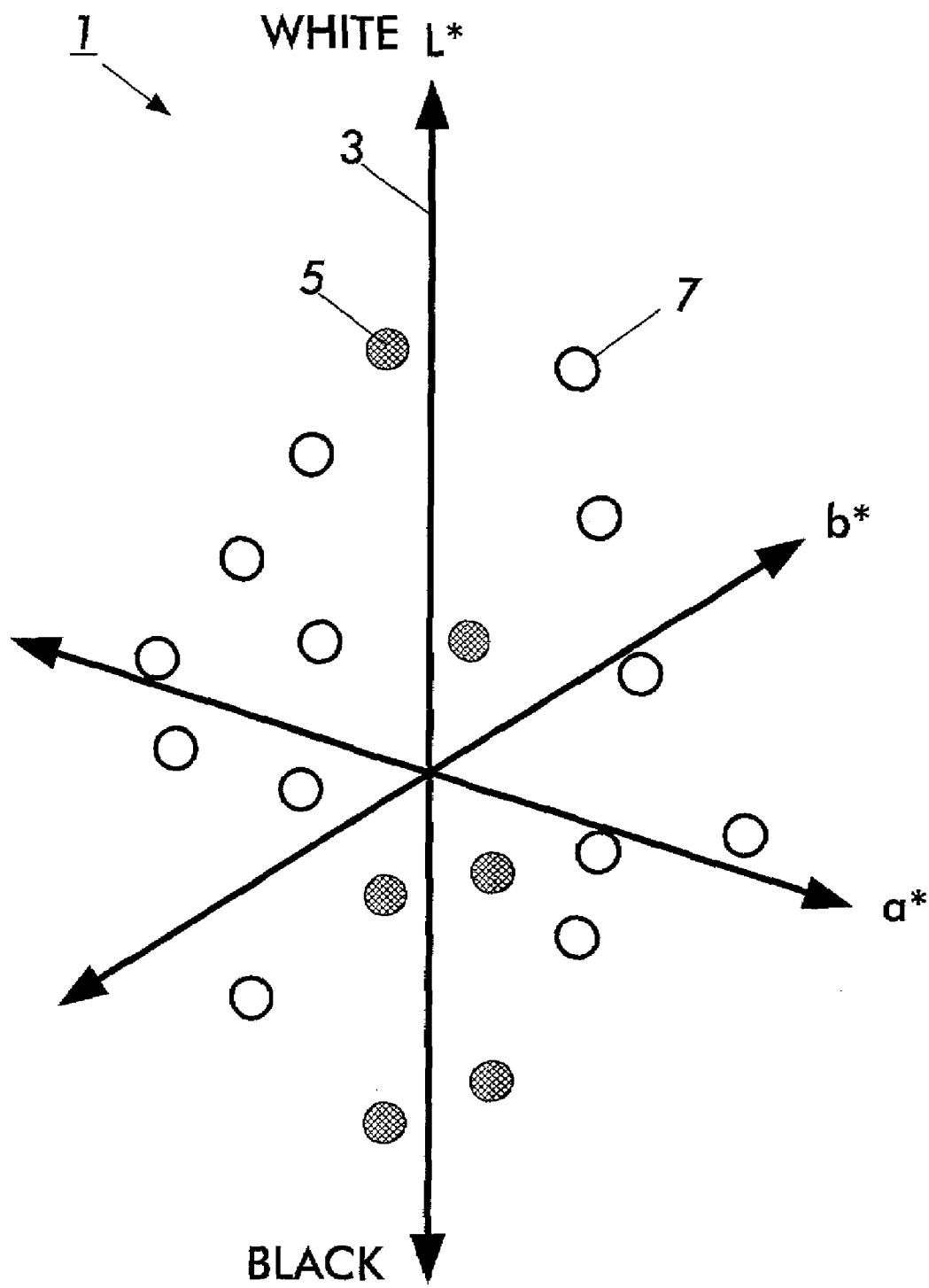
FIG. 1 shows neutral pixels and non-neutral (color) pixels within an L*a*b* color space.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, neutral pixels and non-neutral (color) pixels within an L*a*b* color space 1 are shown. When viewing a distribution of pixels from image data in three dimensions within the L*a*b* color space 1, points near the L* axis 3 are neutral pixels 5, while points more distant from the L* axis 3 are non-neutral (color) pixels 7. The neutral pixels 5 are depicted as filled circles. The non-neutral (color) pixels 7 are depicted as circles without any fill pattern.

Figure 2:
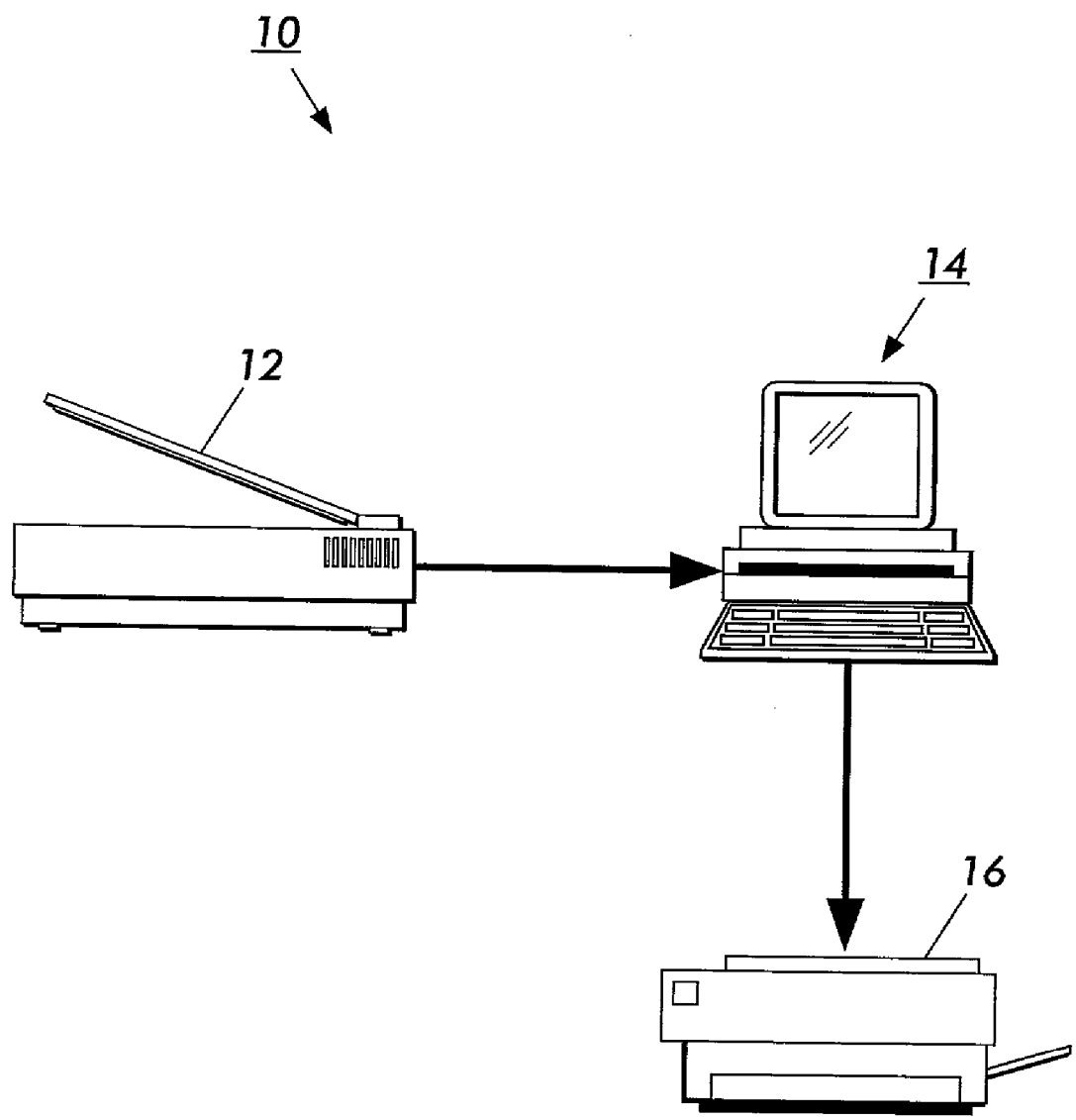
FIG. 2 shows an exemplary color image processing system in an embodiment of the invention.

With reference to FIG. 2, an exemplary color image processing system 10 in an embodiment of the invention is shown. The system 10 includes a color scanner 12, a computer 14, and a printer 16. The color scanner 12 is an example of an input device and provides image data to the computer 14. The computer 14 performs color image processing and provides processed image data to the printer 16. One aspect of the color image processing performed by the computer 14 performs neutral pixel detection in accordance with the invention. The printer 16 is an example of a rendering device and renders the processed image data on media. A similar operation could also be performed by a raster input scanner, image processor, and rendering engine in a color copier.

Since the color image processing in the system 10 is performed on electronic image data in common computer environments and architectures, a variety of additional configurations and scenarios implementing the invention are also possible. For example, the input device could be a storage device with a document or image to be rendered stored as an electronic file. The storage device could be a disk drive, digital camera, or other type of device. The electronic file may have been created on the computer system using application software capable of creating documents or images or created elsewhere and merely connected to the computer 14 or transferred to the storage device. Similarly, the output device can be any rendering device, including any type of display or printer. The color image processing performed on the computer 14, including neutral pixel detection, can be tailored to the color palette and characteristics of the scanner or input device.

Figure 3:
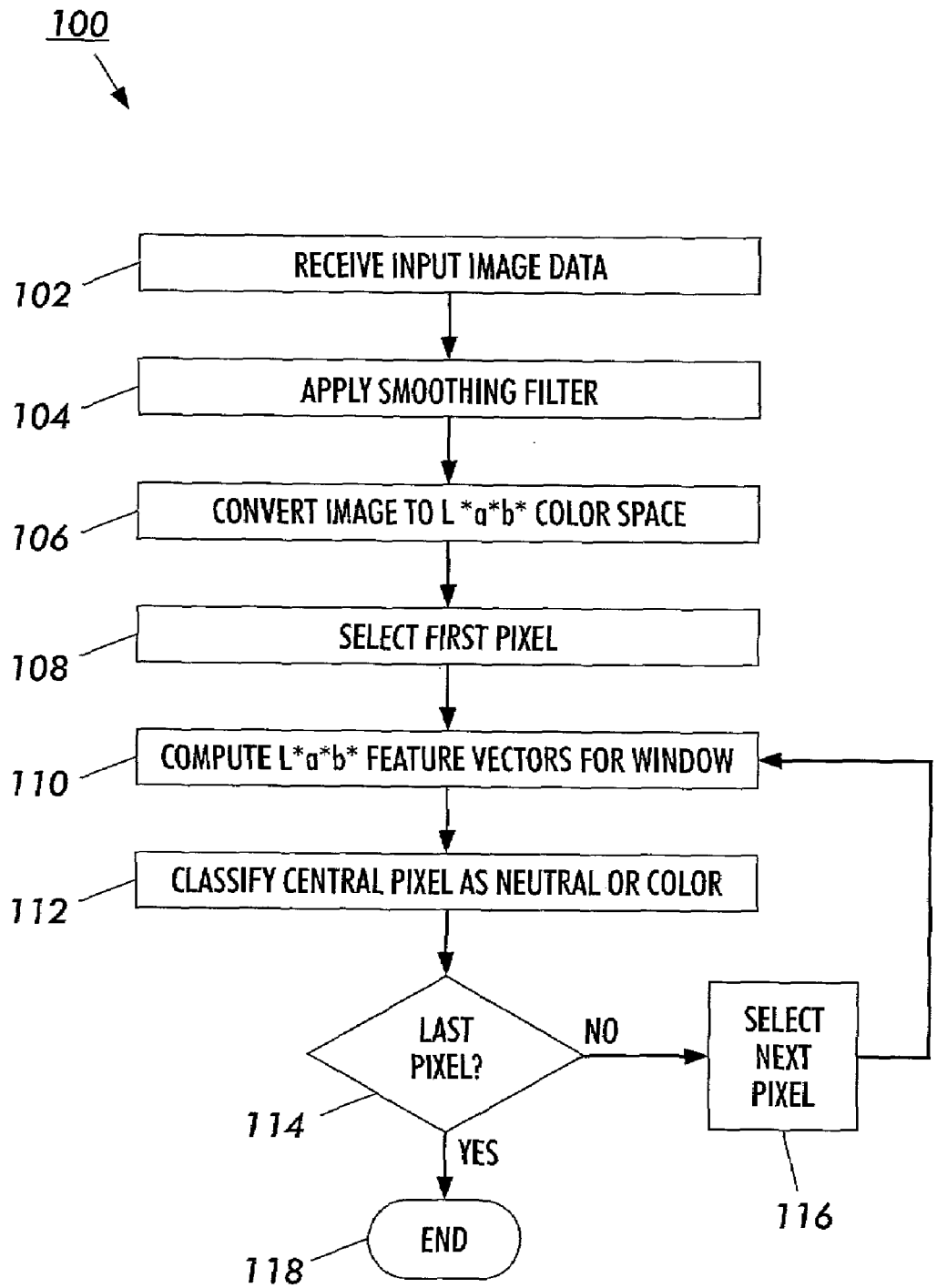
FIG. 3 is a flowchart of a neutral pixel detection method in an embodiment of the invention.

With reference to FIG. 3, a flowchart of a neutral pixel detection method 100 in an embodiment of the invention is shown. The method 100 begins at step 102 when input image data is received 102. Typically, the image is initially represented in the RGB color space. However, for purposes of the invention, the image may be represented in any three-dimensional color space. Next, a smoothing filter is applied 104 to smooth the image to reduce image noise. An averaging filter is a simple kind of smoothing filter and is used here for illustration. The smoothed image is converted to the L*a*b* color space 106. A first pixel to be classified is selected 108 from the L*a*b* representation of the image. Next, L*a*b* feature vectors are computed for a window 110. The window includes the pixel to be classified and neighboring pixels associated with the pixel to be classified. Typically, the pixel to be classified is the central pixel in the window. At step 112, the pixel to be classified is classified as either neutral or color (non-neutral) using a binary classifier. Next, the method must determine if the pixel classified is the last pixel in the image to be classified 114. If the pixel classified is not the last pixel to be classified, the next pixel is selected 116 and the method returns to step 108 to compute L*a*b* feature vectors for a window associated with the next pixel to be classified. Thus, steps 110 through 114 are repeated for each pixel in the image. When the pixel classified is the last pixel to be classified, the method is at its end 116.

The method 100 may be implemented in a strip processing scheme or in a page processing scheme, depending on various economic and performance considerations. Where economic considerations prevail, strip processing is known to require less memory and may be more advantageous. Where performance considerations prevail, page processing may be more advantageous.

FIG. 3 reflects page processing. In other words, the entire image is received in step 102 and stored in a page buffer in the computer 14. At step 104, the entire image is smoothed and stored in a smoothed page buffer in the computer 14.

Likewise, at step 106, the entire image is converted to the L*a*b* color space and stored in an L*a*b* page buffer in the computer 14.

For strip processing, the computer 14 includes a strip buffer, a smoothed strip buffer, and an L*a*b* strip buffer, each buffer comprising a certain number of scanlines. The strip buffer advances through the scanlines of the image in a first-in-first-out (FIFO) fashion. Steps 102 through 116 of the method 100 are performed on the image data in the strip buffer, sequentially producing smoothed image data for the smoothed strip buffer and L*a*b* image data for the L*a*b* strip buffer. Then, the strip buffer is advanced through the image a certain number of scanlines and steps 102 through 116 are repeated until each pixel in the image is classified.

Under both processing schemes, the result is that each pixel in the image is classified as either neutral or color. These results are used in further image processing (i.e., image segmentation and rendering) to eliminate or reduce 3-color or multicolor processing and color rendering. For example, if the entire image or page is neutral, color image processing can be eliminated. Similarly, if one or more regions or objects within an image or page are neutral, color image processing can be reduced. The neutral or color classification of pixels can also be used during rendering so that black ink or toner is used for neutral pixels instead of a combination of color inks or toners to create the neutral pixel.

It is noted that the recited page buffers and strip buffers are associated with image processing functions. In an image processing system 10, where the computer 14 performs image processing functions, the buffers are associated with the computer as described above. However, in alternate image processing systems, such buffers may be migrated to the scanner 12 or the printer 16. In other alternate image processing systems, such buffers may be part of the raster input scanner, image processor, or rendering engine.

Figure 4:
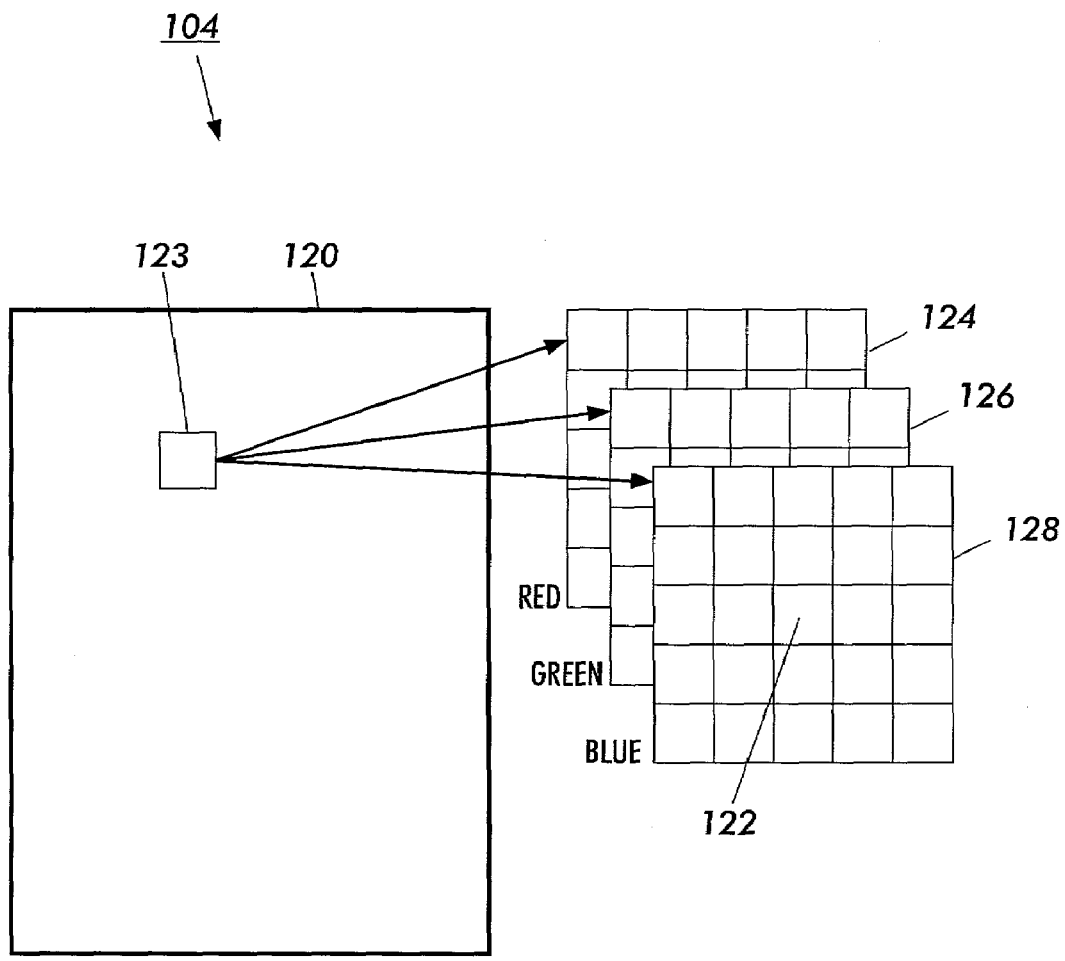
FIG. 4 shows an exemplary implementation of the smoothing filter step of FIG. 3.
Figure 5:
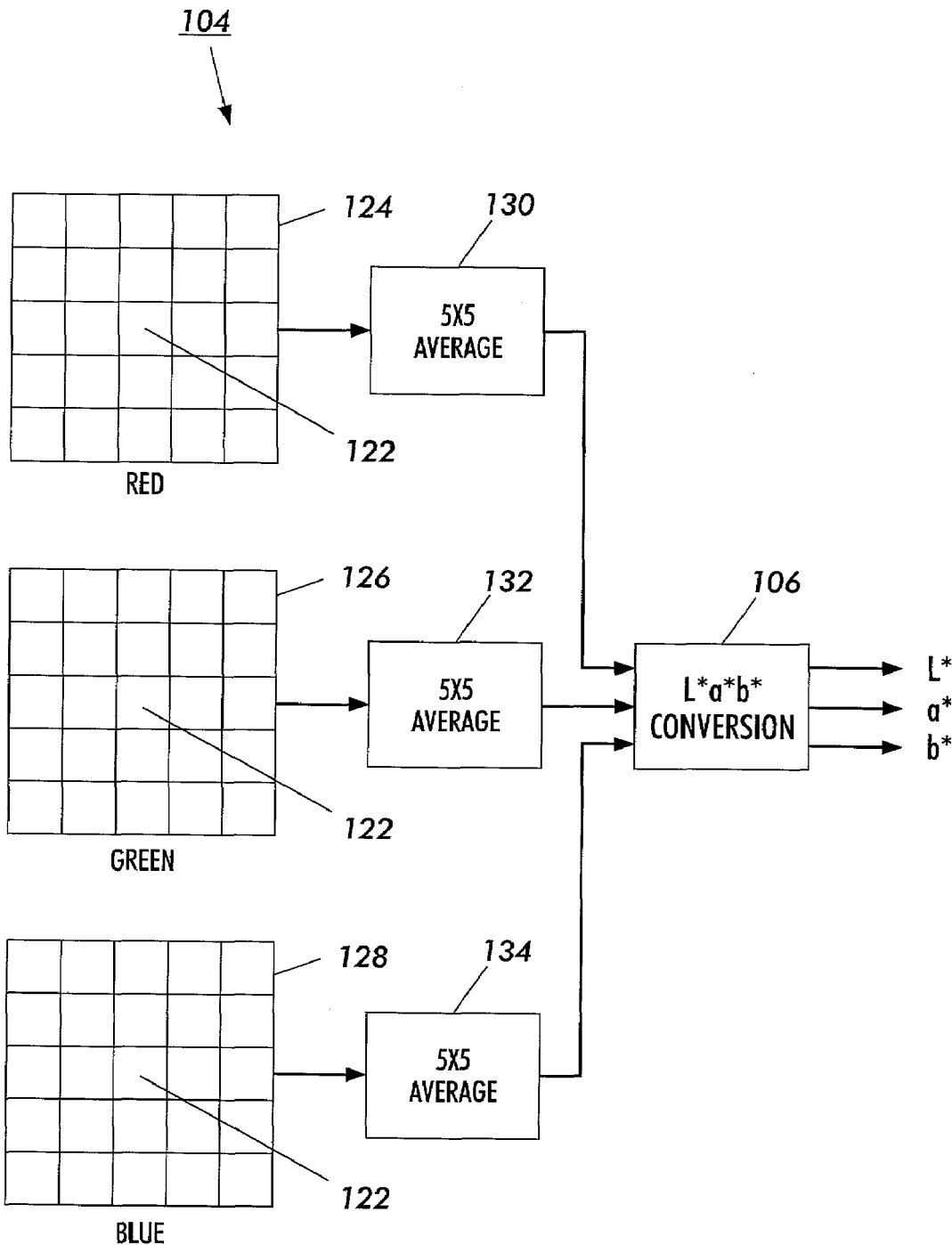
FIG. 5 shows an exemplary implementation of the L*a*b* color space conversion step of FIG. 3.

With reference to FIGS. 4 and 5, an exemplary implementation of the smoothing filter 104 step of FIG. 3 is shown. In this example, the document image 120 is represented in the RGB color space. The smoothing filter 104 is performed on each pixel in the document image 120. In FIG. 4, the pixel 122 being processed is a number of pixels down from the top of the image and a number of pixels to the right of the left side of the image. This reflects a step in the middle of the smoothing process after a number of pixels have already been averaged with a number of additional pixels to be averaged before the process is completed.

In this example, a 5×5 pixel window 123 in red 124, green 126, and blue 128 is used because color scanners typically produce pixel arrays in red, green, and blue. Alternate size windows may also produce satisfactory results. The window 123 is represented in each of the color channels (i.e., red 124, green 126, and blue 128) associated with the input color space. As shown in FIG. 5, an average red value 130 for the central pixel 122 is determined by summing the values of each pixel in the red window 124 and dividing the sum by 25. Likewise, an average green value 132 for the central pixel 122 is determined by summing the values of each pixel in the green window 126 and dividing the sum by 25. An average blue value 134 for the central pixel 122 is determined by summing the values of each pixel in the blue window 128 and dividing the sum by 25. The average values for the central pixel 122 can be determined in parallel or in any sequence. Once the average RGB value is determined for the central pixel 122, the window is advanced one pixel and the smoothing process is repeated until each pixel in the document image 120 is averaged. Typically, the window is advanced left or right in alternating rows and down. However, other patterns of advancing through the image that achieve the desired results are possible.

With continuing reference to FIG. 5, an exemplary implementation of the L*a*b* color space conversion 106 step of FIG. 3 is shown. For purposes of illustrating the L*a*b* conversion process 106, the average RGB values (i.e., 130, 132, 134) for the central pixel 122 are converted to L*a*b* values in the L*a*b* color space. In practice, the L*a*b* conversion process 106 is performed on each pixel in the document image 120.

Figure 6:
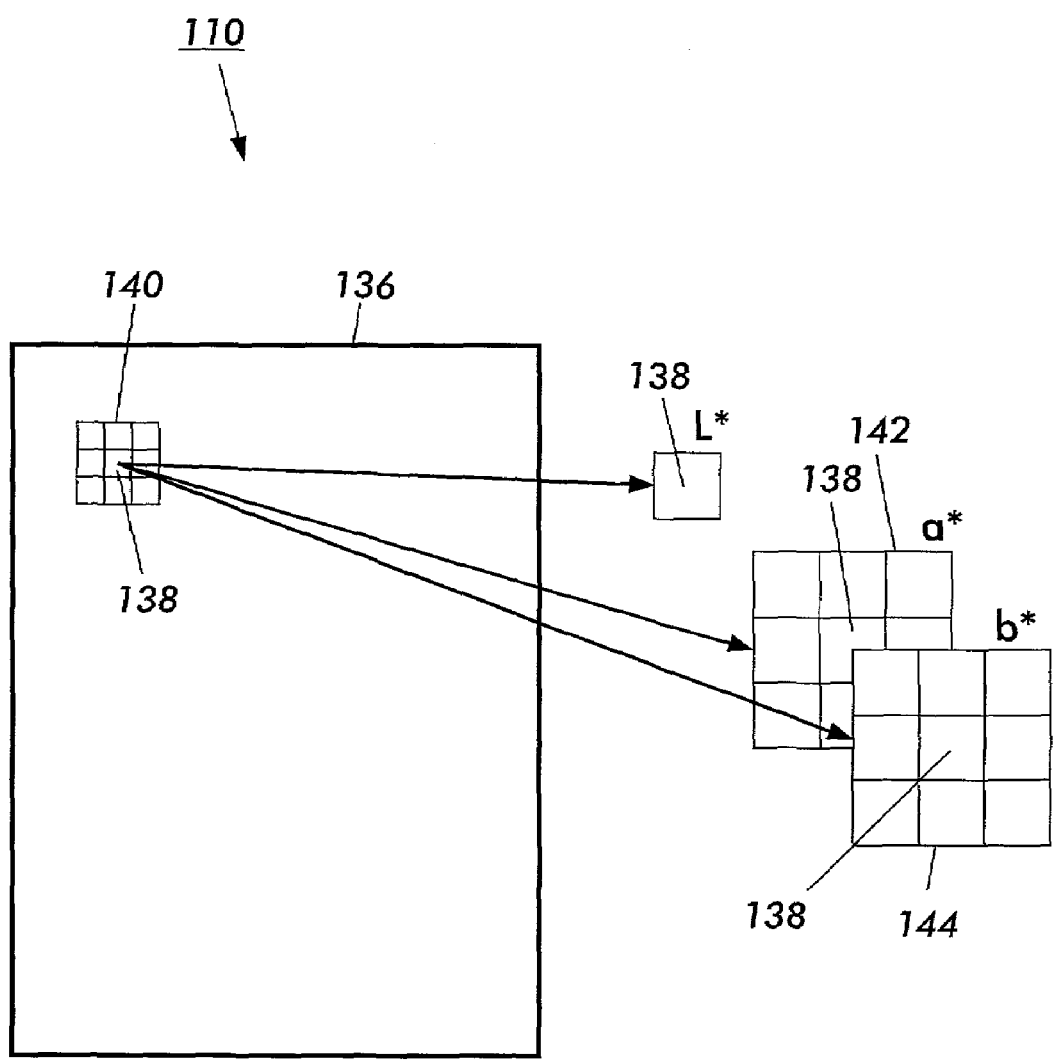
FIG. 6 shows an exemplary implementation of the L*a*b* feature vector computation and classification steps of FIG. 3.
Figure 7:
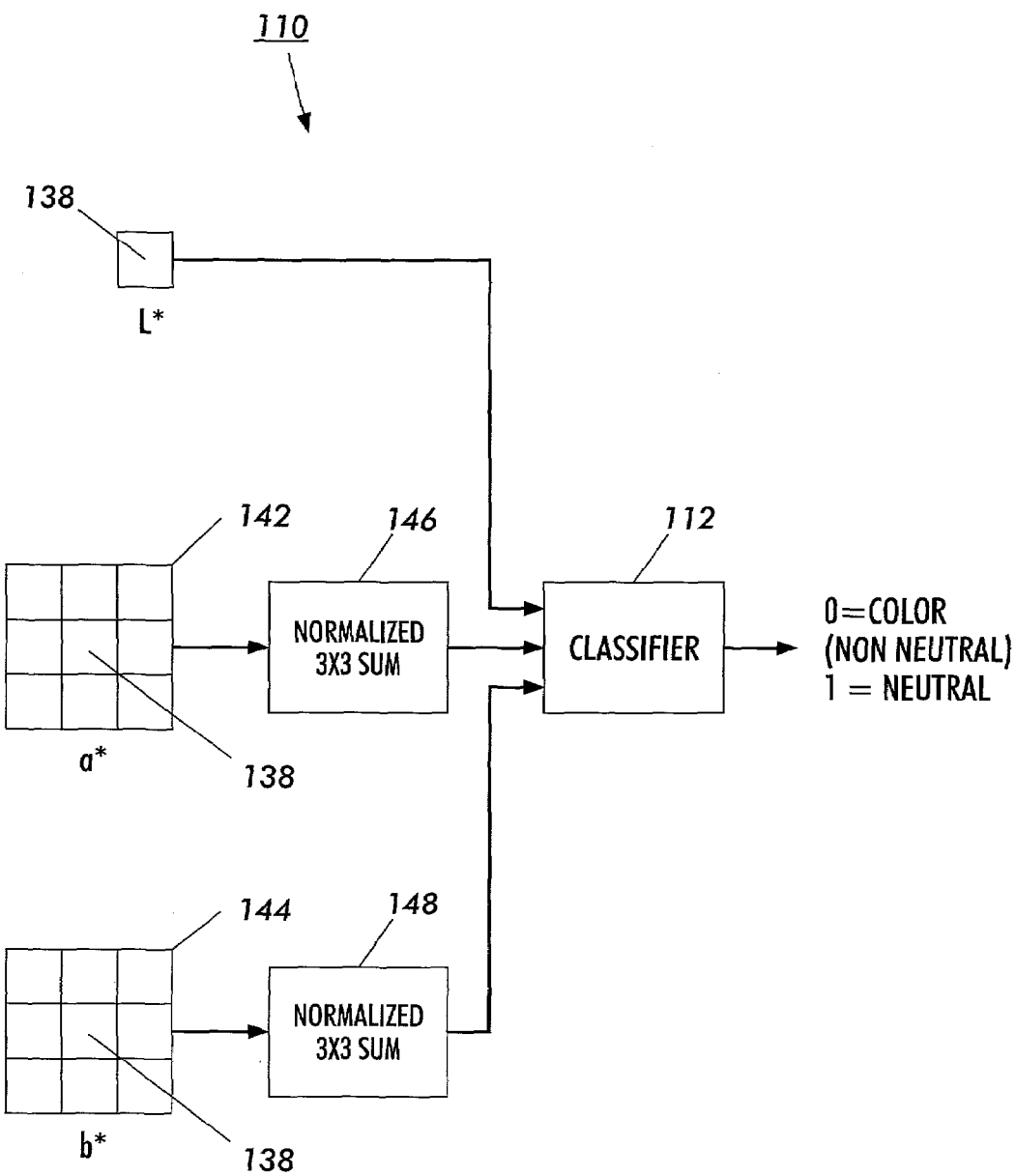
FIG. 7 shows an exemplary implementation of the pixel classification step of FIG. 3.

With reference to FIGS. 6 and 7, an exemplary implementation of L*a*b* feature vector computation 110 step of FIG. 3 is shown. In this example, the document image 120 is represented in an L*a*b* image buffer 136. L*a*b* feature vectors are represented by V1, V2, and V3. The V1 feature vector is associated with the L* channel of the L*a*b* color space. The V2 feature vector is associated with the a* channel of the L*a*b* color space. The V3 feature vector is associated with the b* channel of the L*a*b* color space. L*a*b* feature vector computation 110 is performed on each pixel in the L*a*b* image buffer 136 in conjunction with classification of the pixel as either neutral or color 112. In FIGS. 6 and 7, the pixel 138 for which L*a*b* feature vectors are being computed is a number of pixels down from the top of the image and a number of pixels to the right of the left side of the image. This reflects a step in the middle of the computation/classification process after a number of pixels have already been classified with a number of additional pixels to be classified before the process is completed.

In this example, a 3×3 pixel window 140 is used in the L*a*b* feature vector computation 110. The 3×3 pixel window 140 is used in conjunction with the 5×5 pixel window 123 used for RGB smoothing. Alternate size windows may also produce satisfactory results. The window 140 is represented in an a* channel window 142 and b* channel window 144 of the L*a*b* color space. The central pixel 138 of the window is represented in the L* channel of the L*a*b* color space. In this example, the L*a*b* feature vector are computed using the following equations:

$$V1 = L^*(x, y)/255, \quad (1)$$

$$V2 = (a^*(x-1, y-1) + a^*(x, y-1) + a^*(x+1, y-1) + \quad (2)$$
$$a^*(x-1, y) + a^*(x, y) + a^*(x+1, y) + a^*(x-1, y+1) +$$
$$a^*(x, y+1) + a^*(x+1, y+1))/255, \text{ and}$$

$$V3 = (b^*(x-1, y-1) + b^*(x, y-1) + \quad (3)$$
$$b^*(x+1, y-1) + b^*(x-1, y) + b^*(x, y) + b^*(x+1, y) +$$
$$b^*(x-1, y+1) + b^*(x, y+1) + b^*(x+1, y+1))/255.$$

Where (x,y) are the coordinates of the central pixel with respect to the L*a*b* image buffer 136. In general terms, a) the L* feature vector (V1) is represented by a normalized L* value for the pixel being classified (e.g., normalized by dividing the sum by 255 (i.e., white)), b) the a* feature vectors (V2) is represented by a normalized sum of the a* values for each pixel in the a* window 146 (e.g., normalized by dividing the sum by 255 (i.e., white)), and c) the b* feature vectors (V3) is represented by a normalized sum of the b* values for each pixel in the b* window 148 (e.g., normalized by dividing the sum by 255(i.e., white)). In practice, the L*a*b* feature vectors may be normalized to other scales by changing the value in the denominator.

Once the L*a*b* feature vectors are computed, the values are provided to a classifier for classification of the central pixel 138. Then, the 3×3 window 140 is advanced one pixel and the L*a*b* feature vector computation process is repeated until each pixel in the L*a*b* image buffer 136 is classified. Typically, the window is advanced left or right in alternating rows and down. However, other patterns of advancing through the image that achieve the desired results are possible.

With reference to FIG. 7, an exemplary implementation of the pixel classification 112 step of FIG. 3 is shown. The L*a*b* feature vector values (i.e., V1, V2, and V3) computed for the pixel 140 to be classified are provided to the classifier 112. Based on previously determined logic and thresholds, the classifier determines whether to classify the pixel 140 as neutral or color from the L*a*b* feature vector values (i.e., V1, V2, and V3). In practice, the classifier 112 may be a neural network, a tree classifier, or any type of classifier capable of making a binary decision between the neutral and color classes. Usually it is beneficial to develop a model for a tree classifier by training a tree classifier to properly respond to the feature vectors in a manner tailored to the color palette and characteristics associated with a given scanner or input device. Once trained, the logic and thresholds representing the operations performed by the tree classifier are usually more economically than a neural network classifier.

Figure 8:
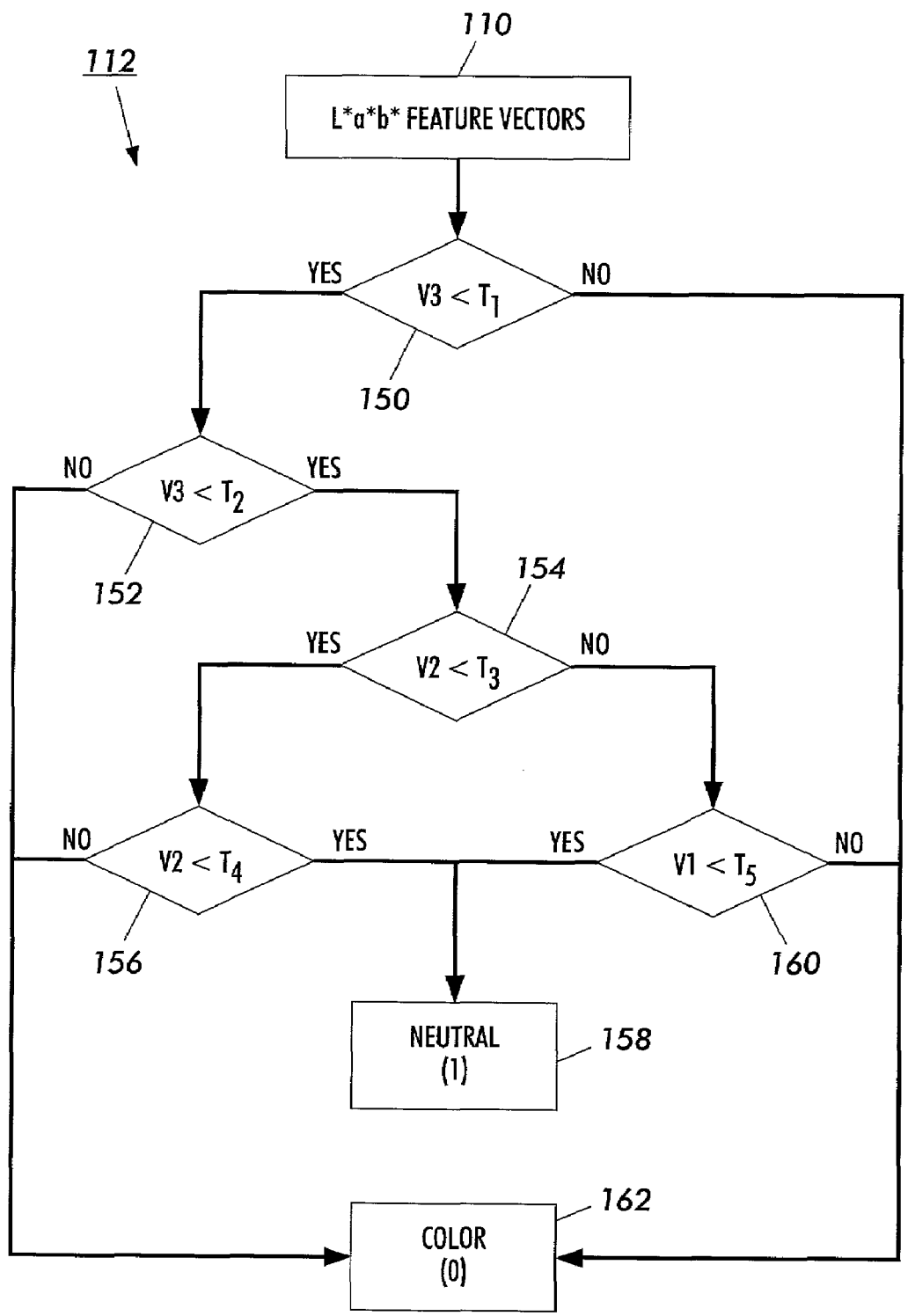
FIG. 8 shows an exemplary implementation of a tree classifier as the classifier of FIG. 7 in an embodiment of the invention.

With reference to FIG. 8, an exemplary implementation of a tree classifier such as the classifier 112 of FIG. 7 in an embodiment of the invention is shown. The classifier 112 receives L*a*b* feature vectors 110 associated with the pixel to be classified. In general, the classifier 112 compares the value of one or more L*a*b* feature vectors to predetermined thresholds until the class of the pixel can be distinguished between neutral or color. The first comparison checks if the V3 feature vector is less than threshold $T_1$ (e.g., 4.6955) 150. If the V3 feature vector is less than threshold $T_1$, a second comparison checks if the V3 feature vector is less than threshold $T_2$ (e.g., 4.4175) 152. If the V3 feature vector is less than threshold $T_2$, a third comparison checks if the V2 feature vector is less than threshold $T_3$ (e.g., 4.6455) 154. If the V2 feature vector is less than threshold $T_3$, a fourth comparison checks if the V2 feature vector is less than threshold $T_4$ (e.g., 4.407) 156. If the V2 feature vector is less than threshold $T_4$, the pixel is classified as neutral 158 and an associated information bit or tag is set to one (1).

The previous paragraph represents one path through the tree classifier. Various alternate paths are also possible. For example, at step 150, if the V3 feature vector is not less than threshold $T_1$, the pixel is classified as color 162 and an associated information bit or tag is set to zero (0). Again, at step 152, if the V3 feature vector is not less than threshold $T_2$, the pixel is classified as color 162 and an associated information bit or tag is set to zero (0). Likewise, at step 156, if the V2 feature vector is not less than threshold $T_4$, the pixel is classified as color 162 and an associated information bit or tag is set to zero (0). Similarly, at step 154, if the V2 feature vector is not less than threshold $T_3$, a final comparison checks if the V1 feature vector is less than threshold $T_5$ (e.g., 0.253) 160. If the V1 feature vector is less than threshold $T_5$, the pixel is classified as neutral 158 and an associated information bit or tag is set to one (1); otherwise, the pixel is classified as color 162 and an associated information bit or tag is set to zero (0).

The tree classifier of FIG. 8, particularly the example threshold values, was created from data sets and statistics generated by training it using a particular model of scanner. Therefore, the structure or logic of the tree classifier and the thresholds identified are tailored to the color palette and characteristics of the subject scanner model. Therefore, the tree classifier of FIG. 8 may or may not produce satisfactory results for other scanners or other type of input devices. Accordingly, tree classifiers, such as the one shown in FIG. 8, may be constructed with quite different logic and thresholds for other scanners and other types of input devices.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof

What is claimed is:

1. A method for classifying a pixel between neutral and color classes for use in color image processing, comprising the following steps:
    a) receiving an input image represented in a first color space;
    b) converting the input image to a second color space wherein one coordinate of the second color space represents lightness, the second color space being an L*a*b* color space;
    c) selecting a pixel in the second color space representation of the input image to be classified;
    d) computing second color space feature vectors associated with the selected pixel including,
        $d_1$) selecting a pixel window associated with the selected pixel,
        $d_2$) computing a first feature vector (V1) based on the selected pixel, computed using the equation:

$V1=L^*(x,y)/255,$ wherein (x,y) are coordinates for the selected pixel within the selected pixel window,
        $d_3$) computing a second feature vector (V2) based on the selected pixel window, and
        $d_4$) computing a third feature vector (V3) based on the selected pixel window; and
    e) classifying the selected pixel between neutral and color classes based on the values computed for the second color space feature vectors.

2. The method as set forth in claim 1, wherein the first color space is an RGB color space.

3. The method as set forth in claim 1, further comprising the following step between steps a) and b):
    f) processing the input image using a smoothing filter to create a smoothed input image.

4. The method as set forth in claim 3, step f) further comprising the following steps:
    g) selecting a pixel in the input image to be filtered;
    h) selecting a pixel window associated with the pixel selected to be filtered;
    i) computing a smoothed value for the pixel selected to be filtered based on the average value of the pixels in the selected pixel window;
    j) determining if any additional pixels of the input image have not been filtered; and k) if any additional pixels to be filtered have not been filtered, selecting a next pixel in the input image to be filtered and repeating steps h) through j).

5. The method as set forth in claim 1, wherein a tree classifier is used to classify the selected pixel in step e).

6. The method as set forth in claim 1, wherein the selected pixel window in step f) is a 3×3 pixel window.

7. The method as set forth in claim 1, wherein a neural network is used to classify the selected pixel in step e).

8. The method as set forth in claim 1, wherein the second feature vector (V2) in step h) is computed using the following equation:

$$V2=(a*(x-1,y-1)+a*(x,y-1)+a*(x+1,y-1)+a*(x-1,y)+a*(x,y)+a*(x+1,y)+a*(x-1,y+1)+a*(x,y+1)+a*(x+1,y+1))/255,$$

wherein (x,y) are coordinates for the selected pixel within the selected pixel window.

9. The method as set forth in claim 1, wherein the third feature vector (V3) in step i) is computed using the following equation:

$$V3=(b*(x-1,y-1)+b*(x,y-1)+b*(x+1,y-1)+b*(x-1,y)+b*(x,y)+b*(x+1,y)+b*(x-1,y+1)+b*(x,y+1)+b*(x+1,y1))/255,$$

wherein (x,y) are coordinates for the selected pixel within the selected pixel window.

10. A method for neutral pixel detection for use in color image processing, comprising the following steps:
   a) receiving an input image represented in a first color space;
   b) converting the input image to a second color space wherein one coordinate of the second color space represents lightness, the second color space being an L*a*b* color space;
   c) selecting a pixel in the second color space representation of the input image;
   d) computing second color space feature vectors associated with the selected pixel including,
      $d_1$) selecting a pixel window associated with the selected pixel,
      $d_2$) computing a first feature vector (V1) based on the selected pixel, computed using the equation:

$$V1=L*(x,y)/255,$$

wherein (x,y) are coordinates for the selected pixel within the selected pixel window,
      $d_3$) computing a second feature vector (V2) based on the selected pixel window, and
      $d_4$) computing a third feature vector (V3) based on the selected pixel window; and
   e) detecting if the selected pixel is neutral based on the values computed for the second color space feature vectors.

11. The method as set forth in claim 10, further comprising the following step between steps a) and b):

f) processing the input image using a smoothing filter to created a smoothed input image.

12. The method as set forth in claim 11, wherein the selected pixel window in step f) is a 3×3 pixel window.

13. A method for classifying pixels of an input image between neutral and color classes for use in color image processing, comprising the following steps:
   a) receiving a first strip of an input image represented in a first color space wherein the strip is comprised of a plurality of scanlines;
   b) converting the input image strip to a second color space wherein one coordinate of the second color space represents lightness;
   c) selecting a first pixel in the second color space representation of the input image strip to be classified;
   d) computing second color space feature vectors associated with the selected pixel;
   e) classifying the selected pixel between neutral and color classes based on the values computed for the second color space feature vectors;
   f) determining if any additional pixels of the input image strip to be classified have not been classified;
   g) if any additional pixels to be classified have not been classified, selecting a next pixel in the second color space representation of the input image strip to be classified and repeating steps d) through f);
   h) determining if any additional scanlines in the input image have not been received in an input image strip; and
   i) if any additional scanlines have not been received in an input image strip, appending one or more next scanlines in the input image to the strip while ousting one or more corresponding scanlines from the strip in a first-in-first-out fashion and repeating steps b) through g).

14. The method as set forth in claim 13, further comprising the following step between steps a) and b):
   h) processing the input image strip using a smoothing filter to create a smoothed input image strip.

15. The method as set forth in claim 13, step d) further comprising the following steps:
   h) selecting a pixel window associated with the selected pixel;
   i) computing a first feature vector (V1) based on the selected pixel;
   j) computing a second feature vector (V2) based on the selected pixel window; and
   k) computing a third feature vector (V3) based on the selected pixel window.

16. The method as set forth in claim 15, wherein the second color space is an L*a*b* color space wherein the selected pixel window in step h) is a 3×3 pixel window.

* * * * *